(12) United States Patent
Spirt et al.

(10) Patent No.: US 11,153,185 B2
(45) Date of Patent: *Oct. 19, 2021

(54) NETWORK DEVICE SNAPSHOTS

(71) Applicant: HEWLETT PACKARD ENTERPRISE DEVELOPMENT LP, Houston, TX (US)

(72) Inventors: Alon Oleg Spirt, Santa Clara, CA (US); Akshar Ranka, Santa Clara, CA (US); Michael Zayats, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,019

(22) Filed: May 19, 2020

(65) Prior Publication Data
US 2020/0280502 A1   Sep. 3, 2020

Related U.S. Application Data

(63) Continuation of application No. 15/993,713, filed on May 31, 2018, now Pat. No. 10,693,753.

(51) Int. Cl.
*H04L 12/00* (2006.01)
*H04L 12/26* (2006.01)
(Continued)

(52) U.S. Cl.
CPC .......... *H04L 43/08* (2013.01); *H04L 12/4641* (2013.01); *H04L 67/1095* (2013.01)

(58) Field of Classification Search
CPC .. G06F 9/45558; G06F 16/13; G06F 11/1448; G06F 11/2064; G06F 11/2082;
(Continued)

(56) References Cited

U.S. PATENT DOCUMENTS 5,835,953 A  11/1998 Ohran
5,943,391 A   8/1999 Nordling
(Continued)

FOREIGN PATENT DOCUMENTS

WO   WO-2015041686 A1   3/2015

OTHER PUBLICATIONS

Taylor, D., Introducing the Snapshot Debugger Preview for Azure, (Web Page), May 10, 2017, 8 Pgs.

*Primary Examiner* — Frantz Coby

(57) ABSTRACT

Network device snapshots may capture the overall device state of a network device. Individual snapshots or groups of related snapshots (e.g., from different network devices obtained at a common time period) may be used to diagnose, troubleshoot, or correct anomalies or errors within a computer network. The "device state" of a network device may change over time and therefore obfuscate information desired for trouble shooting (e.g., diagnoses) of network errors (or degraded performance periods). Device state may include logical and physical device characteristics at a given instant in time. Network device snapshots may be stored locally on a network device or may be transmitted to external storage on-demand or periodically to accommodate possible limitations of resources on the network device. Network device snapshots may be "re-loaded" onto devices, for example in a lab or clean-room type environment, for comprehensive analysis. Different types of interfaces into network device snapshots are disclosed.

17 Claims, 8 Drawing Sheets

(51) Int. Cl.
*H04L 12/46* (2006.01)
*H04L 29/08* (2006.01)

(58) Field of Classification Search
CPC ............ G06F 11/1456; G06F 16/1748; G06F 16/273; H04L 69/164; H04L 67/1095
USPC ........................................................ 709/224
See application file for complete search history.

(56) References Cited

U.S. PATENT DOCUMENTS

| | | |
|---|---|---|
| 6,529,921 B1 | 3/2003 | Berkowitz et al. |
| 6,625,704 B2 | 9/2003 | Winokur |
| 6,993,761 B1 | 1/2006 | Czajkowski et al. |
| 7,165,145 B2 | 1/2007 | Lam |
| 7,242,924 B2 | 7/2007 | Xie |
| 7,363,332 B2 | 4/2008 | Berkowitz et al. |
| 7,395,378 B1 | 7/2008 | Pendharkar et al. |
| 7,774,391 B1 | 8/2010 | Le et al. |
| 8,224,308 B1 | 7/2012 | Gavrylyako et al. |
| 8,299,944 B2 | 10/2012 | Provenzano |
| 8,452,756 B2 | 5/2013 | Anderson et al. |
| 8,719,767 B2 | 5/2014 | Bansod |
| 8,782,472 B2 | 7/2014 | Ganesan et al. |
| 8,935,210 B2 | 1/2015 | Kottomtharayil |
| 9,075,754 B1 | 7/2015 | Sadhu |
| 9,465,721 B2 | 10/2016 | Garrett et al. |
| 9,569,310 B2 | 2/2017 | Raj et al. |
| 9,652,333 B1 | 5/2017 | Bournival et al. |
| 9,658,914 B2 | 5/2017 | Ganesan et al. |
| 10,404,837 B2 | 9/2019 | Banerjee et al. |
| 10,693,753 B2 * | 6/2020 | Spirt .................. H04L 12/4641 |
| 2010/0036896 A1 | 2/2010 | Nakagawa et al. |
| 2012/0089572 A1 | 4/2012 | Raichstein et al. |
| 2012/0323853 A1 | 12/2012 | Fries et al. |
| 2014/0040897 A1 | 2/2014 | Davis et al. |
| 2015/0186044 A1 | 7/2015 | Sharma et al. |
| 2015/0237132 A1 | 8/2015 | Antony |
| 2015/0309890 A1 | 10/2015 | Pershin et al. |
| 2016/0320978 A1 | 11/2016 | Barve et al. |
| 2017/0024224 A1 | 1/2017 | Bakke et al. |
| 2017/0031776 A1 | 2/2017 | Ren et al. |
| 2017/0094034 A1 | 3/2017 | Banerjee et al. |
| 2017/0168901 A1 * | 6/2017 | Tsao .................. G06F 11/1451 |
| 2017/0177462 A1 | 6/2017 | Huang et al. |
| 2018/0113622 A1 * | 4/2018 | Sancheti ............ G06F 11/2094 |
| 2018/0113623 A1 | 4/2018 | Sancheti |

\* cited by examiner

NETWORK DEVICE SNAPSHOTS

CROSS REFERENCE TO RELATED APPLICATION

This application is a continuation of co-pending U.S. patent application Ser. No. 15/993,713 filed May 31, 2018, the entire contents of which are hereby incorporated by reference as though fully set forth herein.

BACKGROUND

In the field of network computing, network connectivity between devices, compute nodes, blades, or frames of a scaleable compute resource may be implemented using a network communication device. Network communication devices, such as switches, routers, hubs, bridges, etc. represent a primary communication path for sharing data between different types of compute resources generically referred to as "nodes" of a network. The shared data may represent inputs to compute processes (e.g., data or applications), outputs of compute resources (e.g., compute results), communications to coordinate distributed processes, communications between users, and other types of data. In any "intelligent" network communication device there may be a processor, local memory, configuration information, and "current state" information, among other types of information. Collectively, the different types of information on a network device may be considered to represent the overall "device state" at a given point in time. For example, information on a network communication device (including its "device state") is expected to change over time, in part, because while in-service and providing active communication paths for a network, the overall configuration and available devices on that network may change.

In general, a switch may be thought of as a device in a computer network that connects together other devices (generically referred to as "nodes" of the network). Multiple data cables may be plugged into a switch to enable communication between different networked devices. Switches manage the flow of data across a network by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

Switches, hubs, Routers, etc. are examples of network communication devices that may benefit from the concepts of this disclosure. Other examples of network communication devices that may also benefit include, but are not limited to: wireless access points, remote access servers, bridges, brouters, etc. Also, some network communication devices do not fit into a single classification and may be hybrids of two classes of devices (e.g., a brouter is a bridge-router hybrid). In general, this disclosure represents an improvement to the art of network computing by providing enhanced diagnostic information that may be used to improve performance, security, and reliability of a network (e.g., a corporate infrastructure network).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
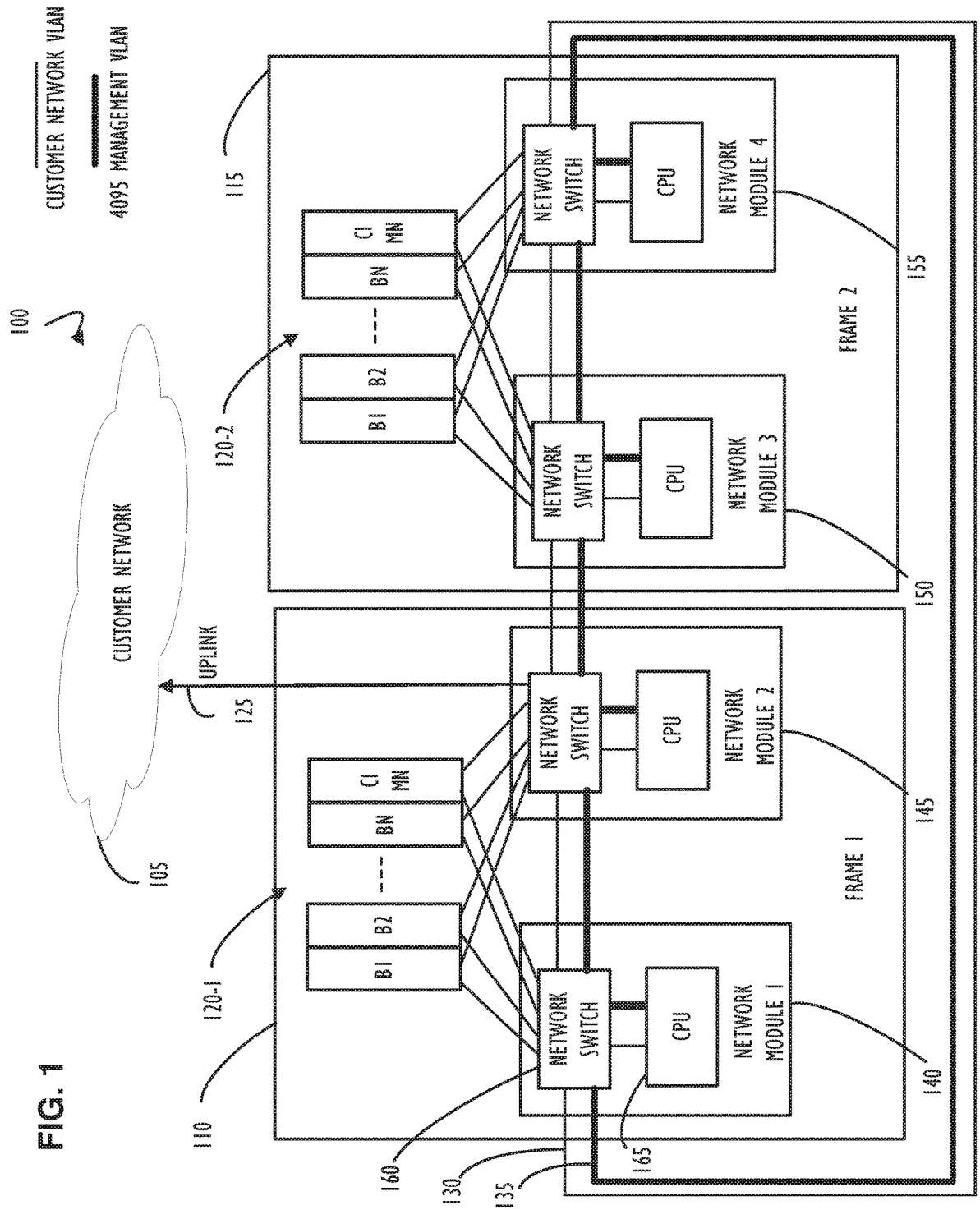
FIG. 1 is a functional block diagram of a computer infrastructure including multiple frame scaleable compute resources, a customer VLAN, and a management VLAN, according to one or more disclosed implementations.

Network device snapshots may be used to capture the overall device state of a network device. Individual snapshots or groups of related snapshots (e.g., from different network devices obtained at a common time period) may be used to diagnose, troubleshoot, or correct anomalies or errors within a computer network. The "device state" of a network device may change over time and therefore obfuscate information desired for trouble shooting (e.g., diagnoses) of network errors (or degraded performance periods).

As referred to herein, a "device state" may be thought of to include comprehensive logical and physical device characteristics at a given instant in time. Network device snapshots providing the device state may be stored locally on a network device or may be transmitted to external storage on-demand or periodically to accommodate possible limitations of resources on the network device. Network device snapshots may be "re-loaded" onto devices, for example in a lab or clean-room type environment, for comprehensive analysis. Different types of interfaces into network device snapshots are disclosed.

An Ethernet switch generally operates at the data link layer (layer 2) of the Open Systems Interconnection (OSI) model to create a separate collision domain for each switch port. Each device connected to a switch port can transfer data to any of the other ports at any time and the transmissions will not interfere with each other. Also, because broadcasts are still being forwarded to all connected devices by the switch, the newly formed network segment (e.g., between the switch port and the attached device) continues to be a broadcast domain. Switches may also operate at higher layers of the OSI model, including the network layer and above. A device that also operates at these higher layers may be referred to as a multilayer switch.

In some switches, built-in or modular interfaces may make it possible to connect different types of networks, including Ethernet, Fibre Channel, Rapidio, ATM, ITU-T G.hn and 802.11. This connectivity can be at different layers of the OSI model. While the layer-2 functionality may be adequate for bandwidth-shifting within one technology, interconnecting technologies such as Ethernet and token ring may be performed more easily at layer 3 or via routing. Devices that interconnect at the layer 3 are traditionally called routers, so layer 3 switches can also be regarded as relatively primitive and specialized routers.

Sometimes, for example, where there is a need for a great deal of analysis of network performance and security, switches may be connected between WAN routers as places for analytic modules. Some vendors provide firewall, network intrusion detection, and performance analysis modules that can plug into switch ports. Some of these functions may be on combined modules or integrated into a network device itself.

A router is another type of network computing device that may benefit from the concepts of this disclosure. In general, a router is a networking device that forwards data packets between computer networks. Routers perform the traffic directing functions on the Internet. A data packet is typically forwarded from one router to another router through the networks that constitute an internetwork until it reaches its destination node.

In a typical configuration, a router is connected to two or more data lines from different networks. In this configuration, when a data packet comes in on one of the lines, the router reads the network address information in the packet to determine the ultimate destination. Then, using information in its routing table or routing policy, it directs the packet to the next network on its journey.

When multiple routers are used in interconnected networks, the routers can exchange information about destination addresses using a routing protocol. Each router may build up a routing table listing the preferred routes between any two systems on the interconnected networks.

As can be seen from this brief overview of switches and routers, network communication devices range from simple forwarding type devices (e.g., hub) to more "intelligent" devices that "learn" about a network topology and attempt to make communications more efficient (e.g., switch/router). Devices that have intelligence likely contain configuration information and run-time control information (e.g., routing tables) that may change dynamically as packets are exchanged through that device. Other types of network devices may also be classified as "intelligent" devices that perform communication connectivity and may benefit from the concepts of this disclosure (e.g., wireless access point, hot-spots, etc.). Each of these intelligent network communication devices may be considered to have a "state" that represents an instantaneous view into the operational capabilities, current configuration, and current processor attributes (e.g., code execution information, memory usage, and register settings) of that device. This overall device state may be captured in a manner (i.e., the disclosed device snapshot) that it may be later recreated to a substantially identical instance of that device. The substantially identical instance (including all available instantaneous settings) may be loaded, for example, in a lab replica device or that same device at a later time.

Referring to FIG. 1, an example computer infrastructure 100 is illustrated. In this example, customer network 105 is connected to a set of frames (represented by frame 1 110, and frame 2 115). Of course, more than two frames may be present but for simplicity of this disclosure only two are shown in this example. As indicated by arrow 120-1, frame 1 may be configured with a set of blades (B1, B2, . . . BN) and a Composable Infrastructure (CI) module. Similarly, arrow 120-2 indicates that frame 2 may be configured in a like manner. Frame 1 further includes two network modules 140 and 145 (sometimes referred to as a Frame Link Module (FLM)). Frame 2 also include two network modules 150 and 155. These network modules provide connectivity for the compute resources represented by the blades. Each of the blades is shown with a network connection to a network switch 160 disposed within each individual network module (e.g., network module 1, 140). Each network module further includes a CPU 165 to facilitate configuration, monitoring, and maintenance of a corresponding network switch 160. Network switch 160 is an example of an "embedded" switch that is part of a larger device, in this case a network module and then in turn a Frame. Other network switches may be stand-alone device. In either case, a network switch may be considered a network device in accordance with concepts of this disclosure.

Connectivity (at a given time) from a set of frames to a customer network is typically provided by a single uplink (e.g., uplink 125) from exactly one of the plurality of network switches that exist across the multiple FLMs of a group of connected frames. That is, all communications external to the group of connected frames passes through uplink 125. As further illustrated in computer infrastructure 100, customer VLAN 130 connects each of the network switches 160 in an ethernet ring network and extends to the customer network 105 (e.g., includes VLANS 1-4094). A second ring network, 4095 management VLAN 135, is also shown in FIG. 1. 4095 management VLAN is shown in a bolder line than customer VLAN 130 and also connects each of the network switches 160. Note, in a proper configuration of a group of frames according to one example high-availability implementation, each network switch will be directly connected to each neighboring switch (either in the same frame or an adjacent frame) and no intervening network devices are present.

A virtual LAN (VLAN) refers to a broadcast domain that is partitioned and isolated in a computer network at the data link layer (OSI layer 2). LAN is the abbreviation for local area network and, in this context, virtual refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4095 management VLAN 135 in FIG. 1. Each network switch 160 may have a different device state with respect to other network switches and that device state may change over time. Accordingly, capture of a network device snapshot across all network modules of a set of frames may be helpful to diagnose any communication issues experienced by the comprehensive set of related compute devices.

Figure 2:
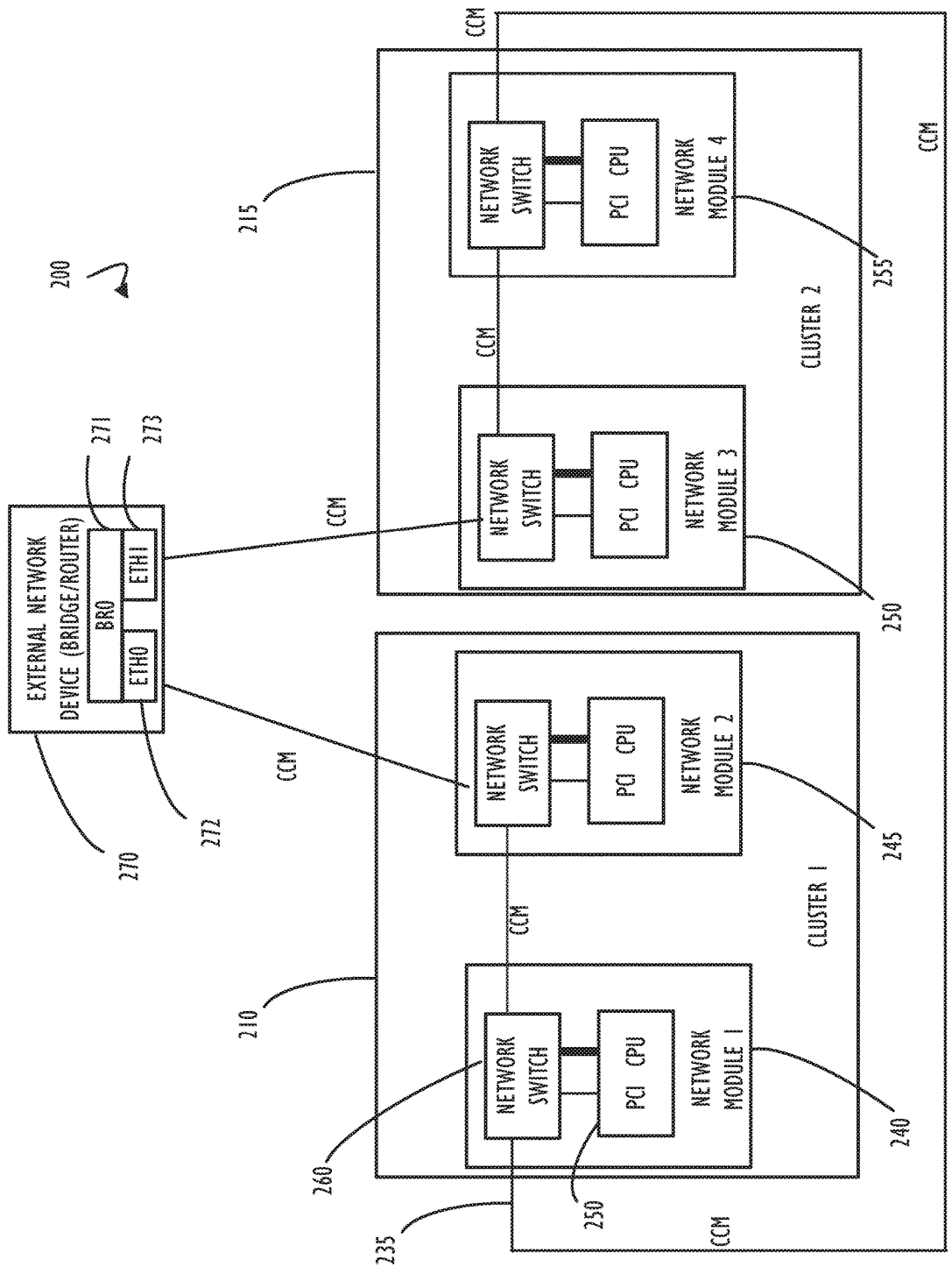
FIG. 2 is a functional block diagram representing a first example of an external network device disposed physically between two network switches of two independent frames (or similarly configured blade resources), according to one or more disclosed implementations.

Referring now to FIG. 2, computer infrastructure 200 illustrates another connectivity possibility between independent network frames or possibly independent clusters of compute resources. Note, in the example of FIG. 2, the links between cluster compute resources Cluster 1 (210) and Cluster 2 (215) (specifically between Network Module 2 (245) and Network Module 3 (250)) do not represent a direct connection. Cluster 1 (210) and Cluster 2 (215) may be thought of as independent but related cluster resources.

For example, Cluster 2 (215) may be configured as a "hot backup" to Cluster 1 (210). Communication path 235 may provide communication directly between Cluster 1 (210) and Cluster 2 (215) to support exchange of role information and heartbeat information as appropriate. Further, in this scenario, an external network device such as bridge/router 270 has been inserted to form a communication path between distinct compute resources and possibly provide additional communication to other devices (not shown) and networks (not shown). Accordingly, the state of external network device 270 may, at some point, require trouble shooting (or monitoring) and the device snapshots of this disclosure may assist in that effort.

As illustrated in FIG. 2, a computer infrastructure 200 may include a plurality of different types of network devices (e.g., switch, router, bridge, etc.) that may all benefit from the disclosed embodiments of snapshot capture. Accordingly, examples of this disclosure are not limited to any particular type of network connectivity device and may be applicable to any network device that maintains an internal "state" of processing or connectivity when performing its function. In the example of FIG. 2, network devices with state include each instance of network switch 260 and external network device 270. A device with a strict hardware only coupling, where no processing takes place, may not be a candidate for snapshot, because there may be no "state" capture possible. However, any device that maintains internal adjustable configuration information may be considered to have a "state" for which a snapshot may be made in accordance with this disclosure. In cases where a device does not include internal memory, the state may be captured directly to external storage.

Figure 3:
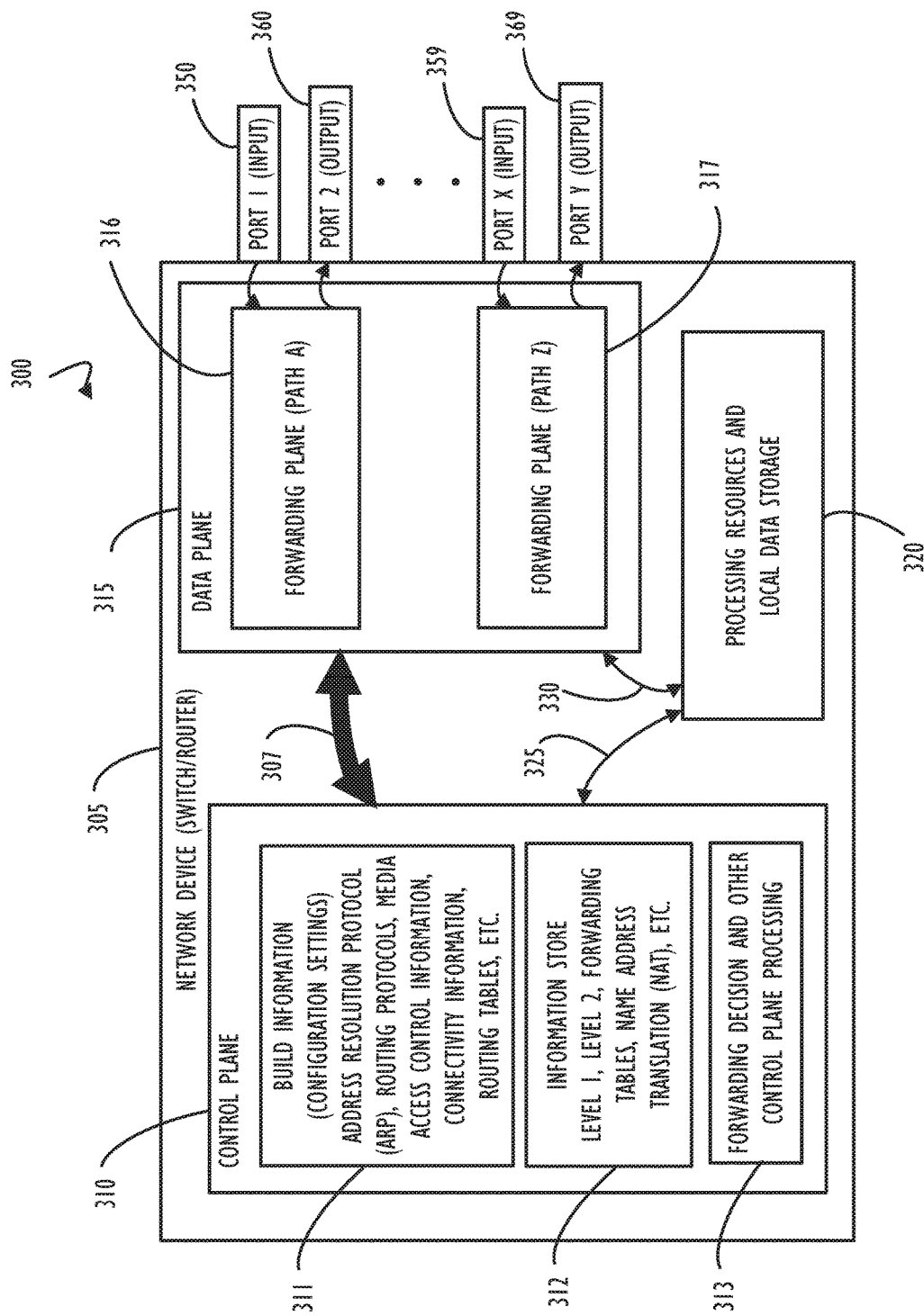
FIG. 3 is a functional block diagram representing a first example of a network device and possible functional components (logical and physical) of the network device, according to one or more disclosed implementations.

Referring now to FIG. 3, a network device such as a switch/router 305 is illustrated as in block diagram 300. In general, a router has two types of network element components organized onto separate planes illustrated as control plane 310 and data plane 315. In addition, a typical switch/router 305 may include processing resources and local data storage 320. Depending on the capabilities of a particular switch/router 305 different types of processing resources and local storage may be present. In general, higher capacity router/switch 305 implementations will include substantial processing resources and memory while simpler (e.g., low capacity) devices will contain less internal resources.

Control plane 310, for example in a router may be used to maintains routing tables (or a single comprehensive routing table) that list which route should be used to forward a data packet, and through which physical interface connection (e.g., output ports 360 through 369). Control plane 310 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 315.

A router may also use a forwarding plane (e.g., part of the data plane 315) that contains different forwarding paths for information from different ports or different destination addresses (e.g., forwarding path A 316 or forwarding path Z 317). In general, The router forwards data packets between incoming (e.g., ports 350-359) and outgoing interface connections (e.g., ports 360-359). The router forwards data packets to the correct network type using information that the packet header contains matched to entries in the FIB supplied by control plane 310. In some networks implementations, a router (e.g., network device 305) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 3, bidirectional arrow 307 indicates that control plane 310 and data plane 315 may work in a coordinated fashion to achieve the overall capabilities of network device 305. Similarly, bidirectional arrow 325 indicates that processing and local data storage resources 320 may interface with control plane 310 to provide processing and storage support for capabilities assigned to control plane 310. Bidirectional arrow 330 indicates that processing and local data storage resources 320 may also interface with data plane 315 as necessary.

Control plane 310 as illustrated in FIG. 3 includes several example functional control blocks. Additional control blocks are possible depending on the capabilities of a particular implementation of a network device 305. Block 311 indicates that control plane 310 may have associated build information regarding a software version of control code that is currently executing on network device 305. In addition, that software version may include configuration settings to determine how network device 305 and its associated control code perform different functions. Many different configuration settings for both the software and the device itself are possible and describing each is beyond the scope of this disclosure. However, the disclosed device snapshot may be designed to capture as many of these configuration settings as possible (hopefully all) to accurately capture a network device state. Block 311 further indicates that different types of routing information and connectivity information may be known to network device 305 and control plane 310. Block 312 indicates that an information store may be accessible from control plane 310 and include forwarding tables or NAT information as appropriate. Block 313 indicates that control plan 310 may also be aware of forwarding decisions and other processing information. Although FIG. 3 illustrates these logical capabilities within control plan 310 they may actually be implemented outside of, but accessible to, control plane 310.

Capability to OSI Level Example Mapping

Capabilities of a network device 305 that may benefit from the disclosed snapshot capabilities may vary greatly. Capabilities of different network devices are generally described with respect to how those capabilities map to the OSI model. A brief overview of the different layers and their typical capability mapping is provided in the next few paragraphs to provide context for this disclosure. However, no particular OSI mapping capability is required to practice the concepts of this disclosure and this information should not be considered limiting in any way.

An Ethernet hub is an example of a simple layer 1 network device (in contrast to a switch that operates at layer 2 and router that operates at layer 3). An Ethernet hub does not manage any of the traffic coming through it. Any packet entering a port may be repeated to the output of every other port except for the port of entry. Specifically, each bit or symbol may be repeated as it flows in.

A layer 2 switch operating as a network bridge may interconnect devices in a home or office for example. The bridge may learn the MAC address of each connected device. Bridges may also buffer an incoming packet and adapt the transmission speed to that of the outgoing port. While there are specialized applications, such as storage area networks, where the input and output interfaces are the same bandwidth, this is not always the case in general LAN applications. Generally, in LANs, a switch may be used for end user access and typically concentrates lower bandwidth and uplinks into a higher bandwidth. Interconnect between switches may be regulated using spanning tree protocol (STP) that disables links so that the resulting local area network is a tree without loops. In contrast to routers, spanning tree bridges have topologies with only one active path between two points. Shortest path bridging is a layer 2 alternative to STP that allows all paths to be active with multiple equal cost paths. Information about the topologies and other information learned by a given network device represent examples of data that may be included in a device snapshot.

A layer-3 switch can perform some or all of the functions normally performed by a router. In some cases, network switches are limited to supporting a single type of physical network, typically Ethernet, whereas a router may support different kinds of physical networks on different ports. As mentioned above, may combination (e.g., hybrid) devices are possible and can perform a variety of functions such that they do not fit neatly into a single category of device. Regardless, of the overall capabilities of the device, the disclosed device snapshot capability may assist in troubleshooting network anomalies.

A common layer-3 capability is awareness of IP multicast through IGMP snooping. With this awareness, a layer-3 switch may increase efficiency by delivering the traffic of a multicast group only to ports where the attached device has signaled that it wants to listen to that group. Layer-3 switches typically support IP routing between VLANs configured on the switch. Some layer-3 switches support the routing protocols that routers use to exchange information about routes between networks.

While the exact meaning of the term layer-4 switch is vendor-dependent, a layer-4 switch almost always includes a capability for network address translation (NAT) and may add some type of load distribution based on Transmission Control Protocol (TCP) sessions or advanced Quality of Service (QoS) capabilities. Further, network devices may include a stateful firewall, a VPN concentrator, or be an IPSec security gateway.

Layer-7 switches may distribute the load based on uniform resource locators (URLs), or by using some installation-specific technique to recognize application-level transactions. A layer-7 switch may include a web cache and participate in a content delivery network (CDN).

Figure 4:
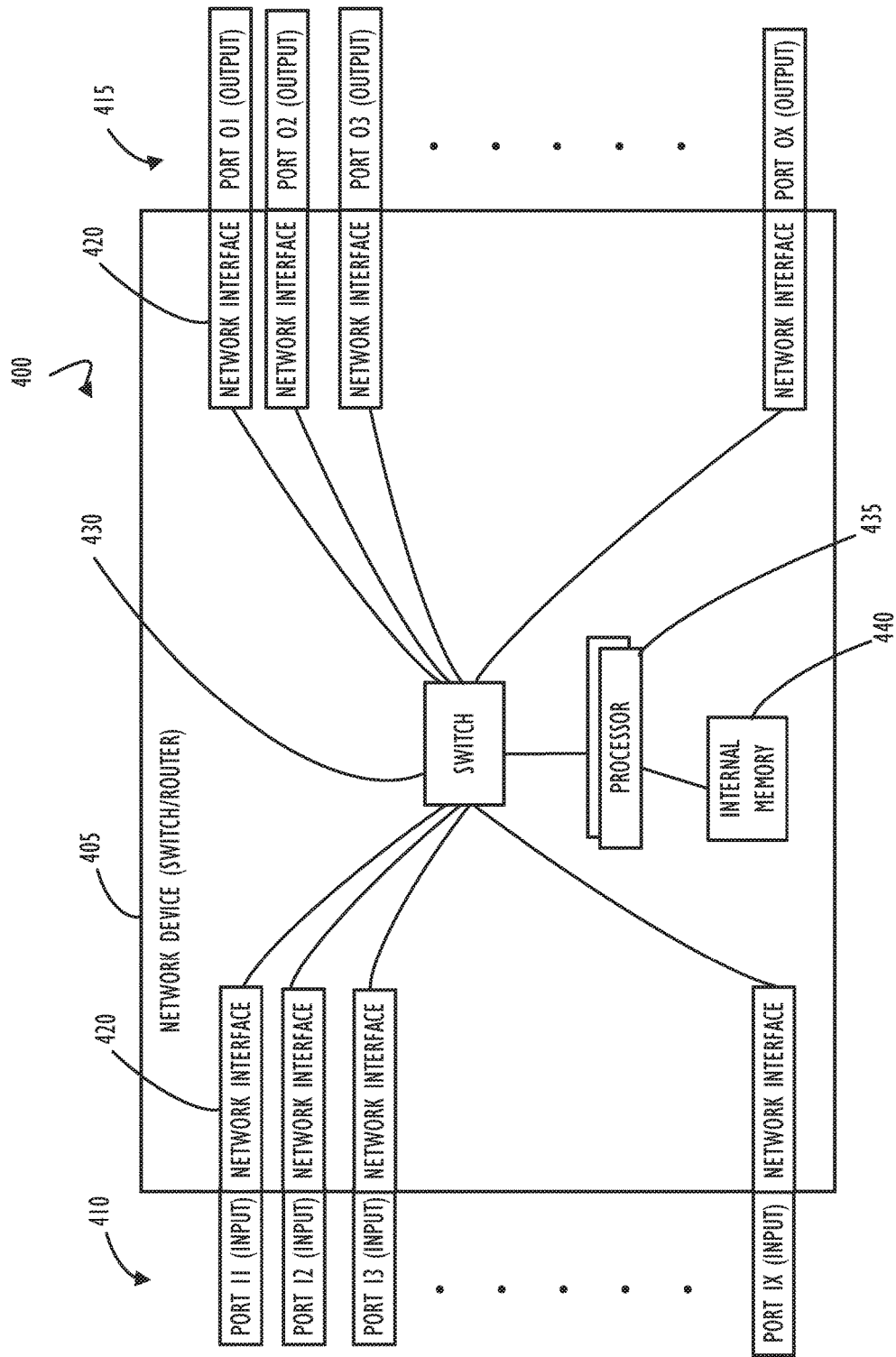
FIG. 4 is a block diagram representing a second example of a network device, according to one or more disclosed implementations.

Referring now to FIG. 4, a simplified network device 405 such as a switch/router is illustrated in block diagram 400. In general, a network device 405 may include an internal switch 430 that communicatively connects a set of input ports 410 via a logical or physical network interface 420 to a set of output ports 415 that also have an associated logical or physical network interface 420. The communication paths established by switch 430 may be controlled by one or more processors 435 (and possibly corresponding hardware logic) and the processors may obtain and store information in internal memory 440. Accordingly, network device 405 represents a relatively basic switch or router architecture that may benefit from the disclosed network device snapshot techniques.

Figure 5:
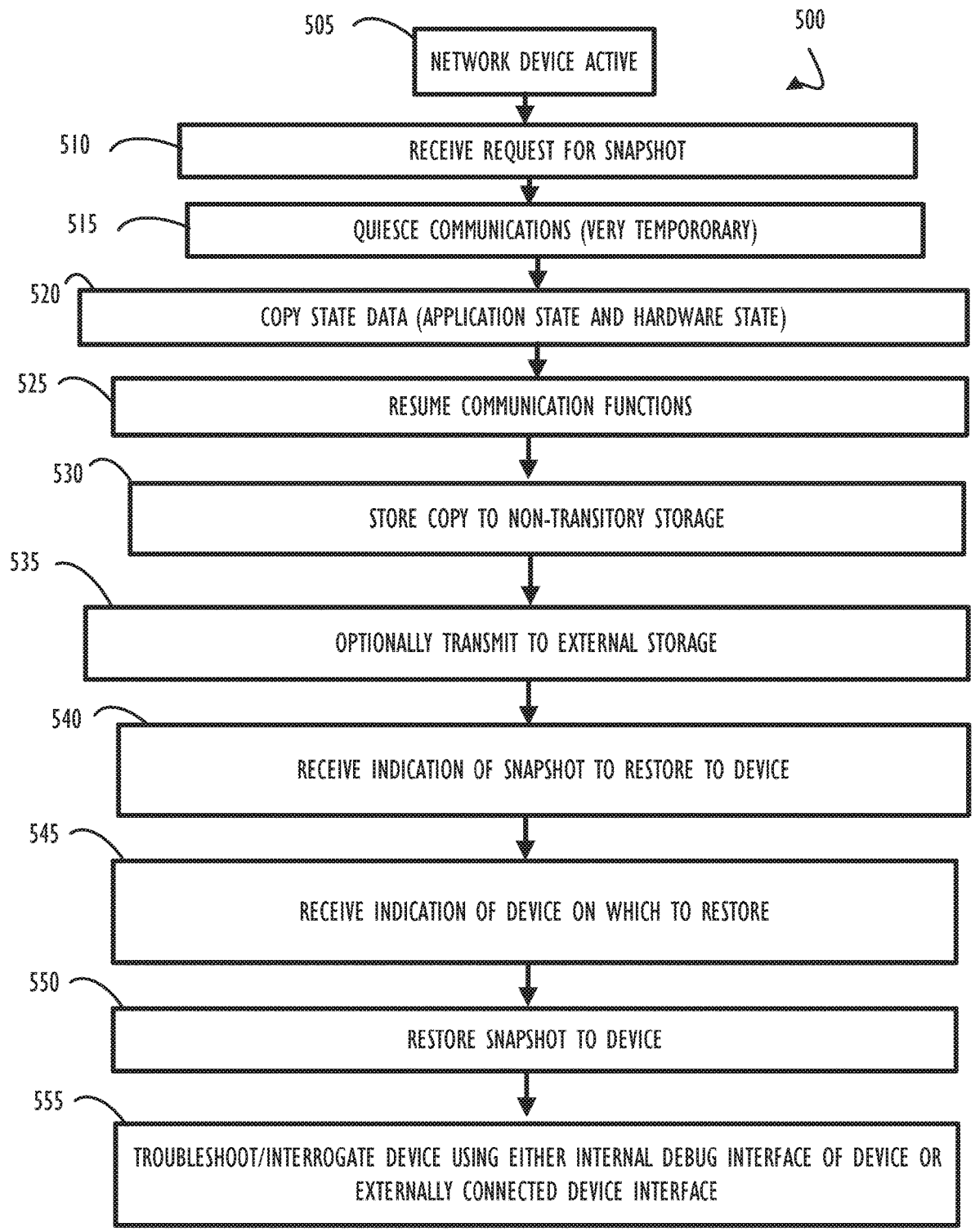
FIG. 5 is a flow chart representing a possible method to perform network device snapshots, according to one or more disclosed implementations.

Referring now to FIG. 5, one example method to capture device snapshots includes a technique to "pause" execution of a network device for a short period of time and capture the operational state of that network device (e.g., network device 405). FIG. 5 illustrates an example method 500, starting at start block 505, that may be performed for each network device in the snapshot process. At block 505 a network device may be active and performing its intended function to support network communications. Either periodically or on demand a request for a network device snapshot may be received as indicated at block 510. Block 515 indicates that, as a result of that request, communications and functions of the network device may be quiesced (e.g., made quiet or suspended) for a temporary period long enough to obtain a consistent state of the network device. Many techniques for quiescing a device are possible, but in general these techniques pause new activities for a short period of time while continuing processing to complete any in-progress activities such that all processing is at a consistent state without transient inconsistent information across processes.

Continuing with FIG. 5, block 520 indicates that a copy of state data, including application processing and hardware state, may be created to form a snapshot. Again, there are different techniques to accomplish the copy function where highly dynamic information may be copied first and other more static data may be copied second (after allowing some functionality to resume, for example). One example of capturing application state includes an operating system function to "fork" a process such that two identical processes are created, and changes are only applied to one of the forks when processing is continued. Other techniques are also possible. Block 535 indicates that processing may be resumed, and communication sessions of the network device may continue (possibly overlapping a time period where the snapshot is still being saved). Block 530 indicates that a copy of the snapshot may be made to non-transitory storage (e.g., in local memory storage of the device). Block 535 indicates that one or more snapshots may be optionally transmitted to external storage. For example, to conserve resources of the network device or to begin further analysis of the snapshot on non-production devices. Block 540 illustrates that an indication of a snapshot to restore may be received. For example, from a user wanting to interrogate a particular device snapshot. Block 545 illustrates that a second indication of a device on which to restore the snapshot may be received. Block 550 indicates that the snapshot may be restored to the identified device. For example, for troubleshooting of a network anomaly that occurred at or around the time period when the snapshot was saved. Method 500 completes with block 555 where either an internal interface of the device that was restored may be used, or an external device connected to the "restored device" may be used to interrogate or troubleshoot the above-mentioned network anomaly.

Figure 6:
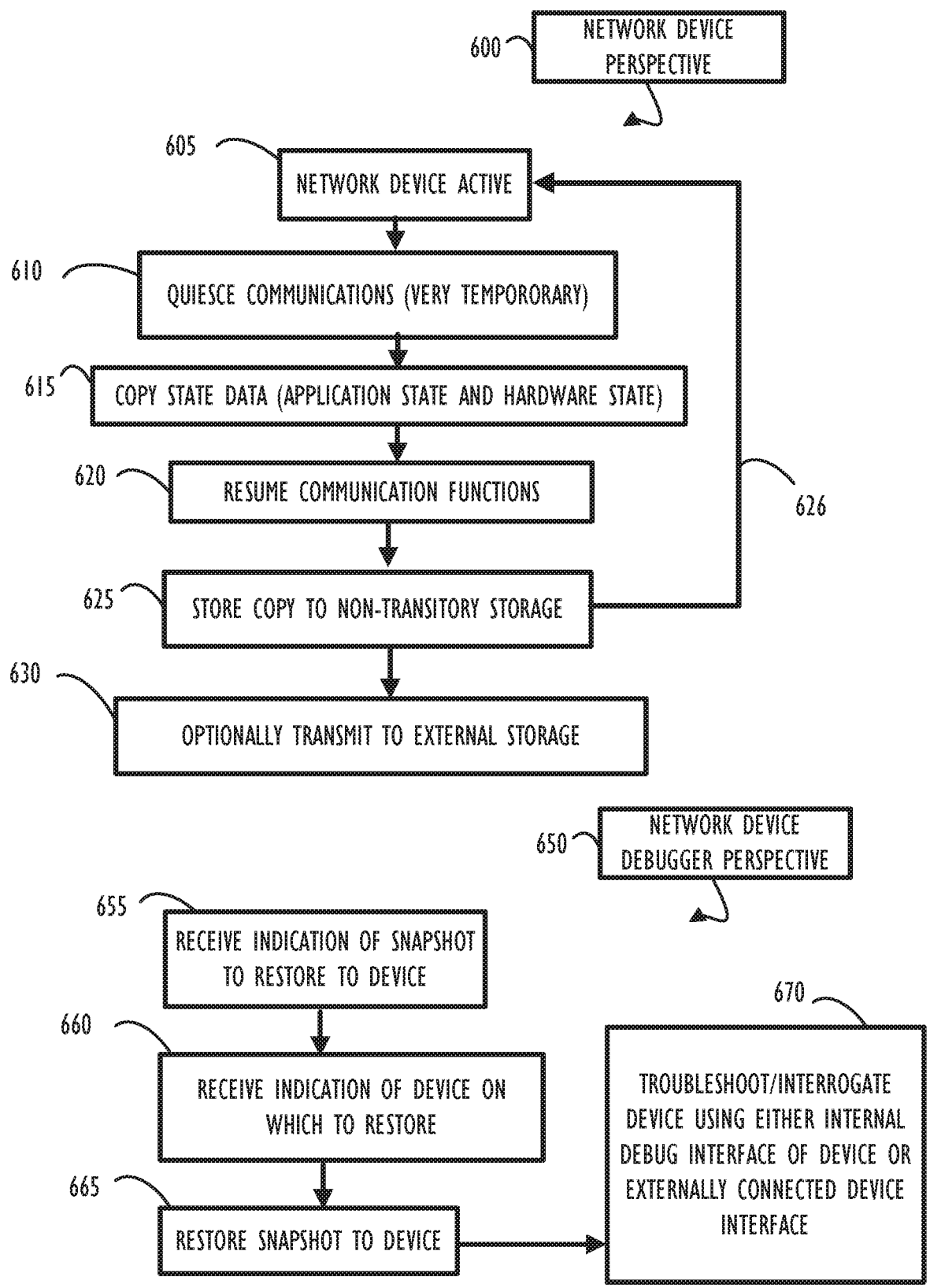
FIG. 6 represents at least two example methods (possibly subparts of the method of FIG. 5) that may be used on different types of devices depending on the perspective and timing of use for that device, according to one or more disclosed embodiments.

Referring now to FIG. 6, at least two example methods 600 and 650 are illustrated. Each of method 600 and 650 may also represent possible subparts of method 500 illustrated in FIG. 5. Methods 600 and 650 may be used on different types of devices depending on the perspective and timing of use for that device, according to one or more disclosed embodiments. In the example of FIG. 6, method 600 represents portions of a technique to capture and use network device snapshots from the perspective of a network device (e.g., 305 or 405). Method 600 begins at block 605 with an active network device. Block 610 indicates that the activities of the network device may be quiesced as described above for method 500. Block 615 indicates that a copy of state data for both hardware and software may be created. Block 620 indicates that communications of the network device may be resumed. Block 625 indicates that a copy of the snapshot may be stored to non-transitory storage (or possibly volatile storage for a period of time). Block 630 indicates that the snapshot may be optionally transmitted to external storage as explained above for method 500.

In the example of FIG. 6, method 650 represents portions of a technique to capture and use network device snapshots from the perspective of an interrogating device or copy of a network device in a non-production (e.g., clean-room) environment. Of course, the snapshot may optionally be restored to the same device on which it was captured but that is not the point of this particular example. Block 655 illustrates that an indication to restore a captured snapshot to a test device, for example, may be received. Block 660 illustrates that a user, for example, may provide an indication of which test device to configure based on the identified snapshot. Block 665 indicates that the snapshot may be restored (e.g., loaded) as requested. Block 670 indicates that troubleshooting or other diagnostic functions, including interrogation of application values, stored data, or configuration information, may be performed on the test device using an internal interface of the test device or another device communicatively coupled to the test device. Note that although a single test device is utilized to explain methods 600 and 650 a related set of devices may also be restored to a time period of a network anomaly because it is common that interaction between different devices may be the cause of the network anomaly. Accordingly, a test environment may include portions of the network infrastructure being diagnosed and may include a number of machines in addition to the network devices. For example, enough resources to recreate and troubleshoot a potentially complex network condition.

Figure 7:
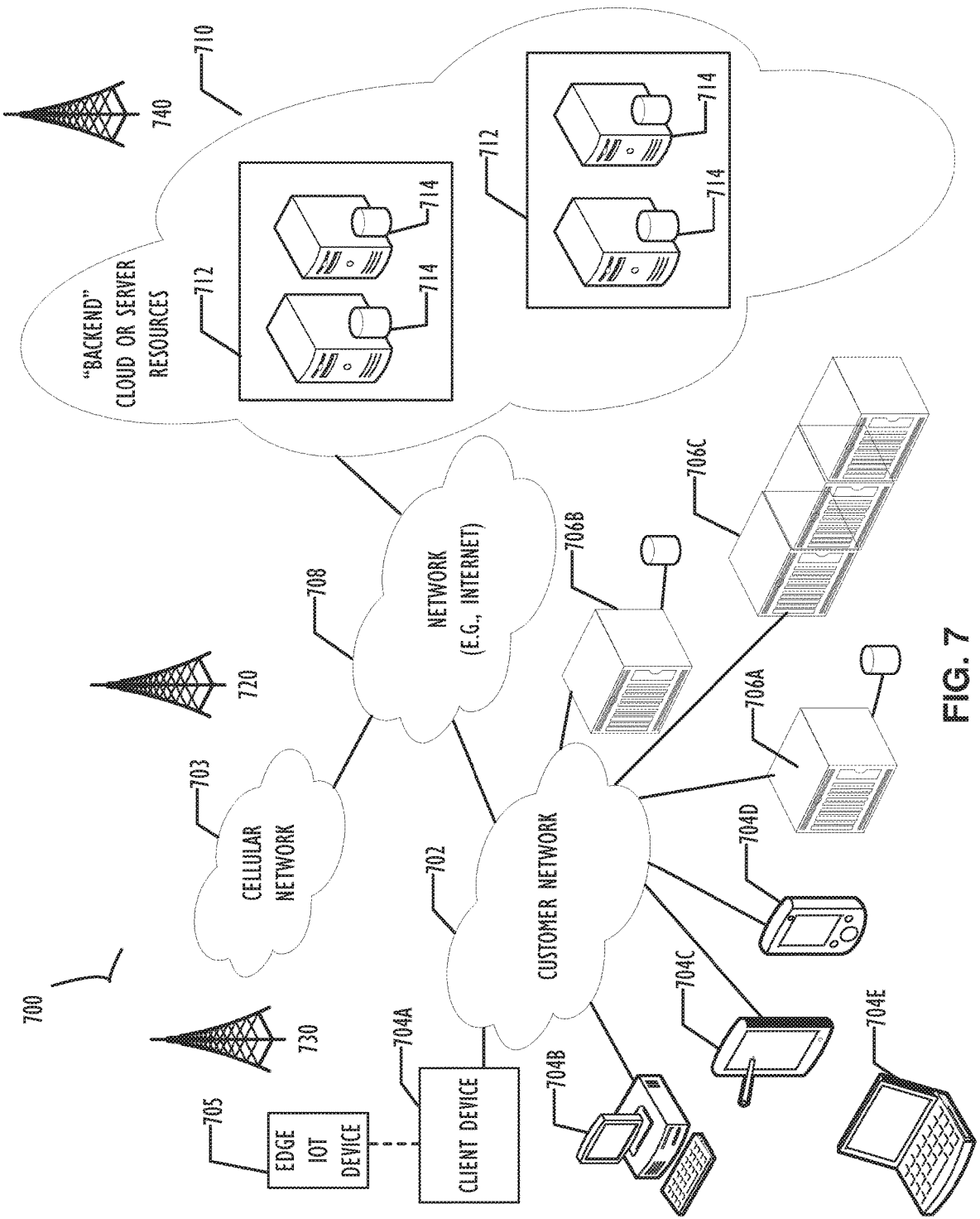
FIG. 7 represents a computer network infrastructure that may be used to implement all or part of the disclosed network device snapshots technique, according to one or more disclosed embodiments.

FIG. 7 represents a computer network infrastructure 700 that may be used to implement all or part of the disclosed network device snapshot technique or provide information flow between a system performing the technique and other computer networks, according to one or more disclosed embodiments. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a network device snapshot method such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the frames outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

Figure 8:
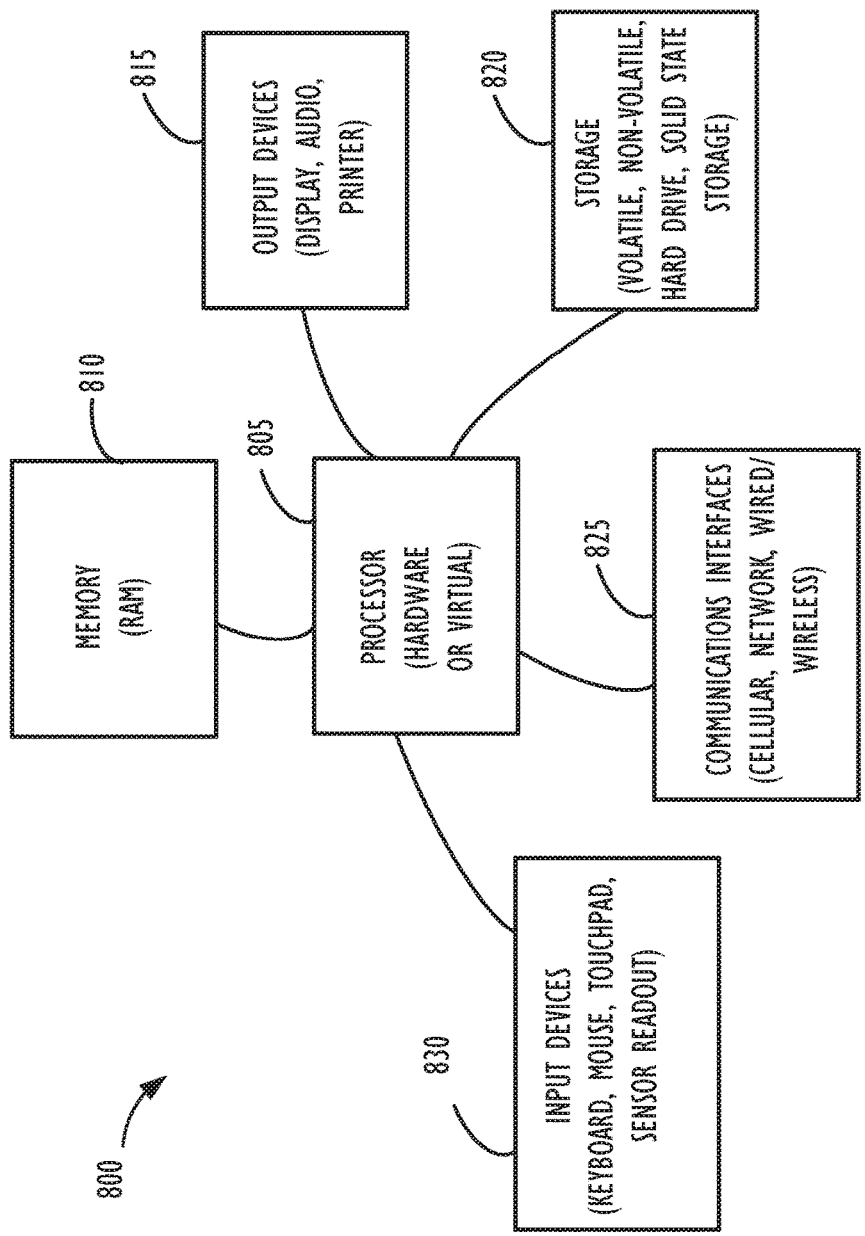
FIG. 8 illustrates a computing device that may be used to implement the functions, modules, processing platforms, execution platforms, communication devices, and other methods and processes of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
receiving an indication to quiesce a first network device;
pausing new communication processing on the first network device for a first period of time sufficient to complete processing of at least a portion of any in-progress communications on the first network device;
creating a first snapshot copy of a first state of the first network device, the first state including information from the first network device describing at least one of: software application run-time execution parameters, software application configuration parameters, hardware run-time execution parameters, and hardware configuration parameters;
resuming communication processing on the first network device;
storing the first snapshot copy of the first state of the first network device; and
receiving an indication to quiesce a second network device concurrently with quiescing the first network device;
pausing new communication processing on the second network device for a second period of time sufficient to complete processing of at least a portion of any in-progress communications on the second network device;
creating a second snapshot copy of a second state of the second network device, the second state including information from the second network device describing software application run-time execution parameters, software application configuration parameters, hardware run-time execution parameters, and hardware configuration parameters;
resuming communication processing on the second network device; and
storing the second snapshot copy of the second state of the second network device.

2. The computer implemented method of claim 1, further comprising transmitting a first copy of the first snapshot copy to a second device for storage on the second device.

3. The computer implemented method of claim 1, further comprising transmitting a second copy of the second snapshot copy to the second device for storage on the second device.

4. The computer implemented method of claim 3, further comprising:
restoring the first snapshot copy to a third network device;
restoring the second snapshot copy to a fourth network device; and
diagnosing a network anomaly using information from the third network device and the fourth network device.

5. The computer implemented method of claim 1, further comprising restoring the first snapshot copy to the first network device.

6. The computer implemented method of claim 5, further comprising diagnosing a network anomaly using information from the first network device after completing a restore of the first snapshot copy.

7. A non-transitory computer readable medium comprising computer executable instructions stored thereon that when executed by one or more processing units, perform a method to create a network device snapshot, the method comprising:
receiving an indication to quiesce a first network device;
pausing new communication processing on the first network device for a first period of time sufficient to complete processing of at least a portion of any in-progress communications on the first network device;
creating a first snapshot copy of a first state of the first network device, the first state including information from the first network device describing software application run-time execution parameters, software application configuration parameters, hardware run-time execution parameters, and hardware configuration parameters;
resuming communication processing on the first network device;
storing the first snapshot copy of the first state of the first network device; and
initiating restore of the first snapshot copy to a second network device;
initiating restore of a second snapshot copy made on a second network device concurrently with the first snapshot copy to a third network device; and
analyzing information from both the first snapshot copy and the second snapshot copy to identify a network anomaly present at a period of time consistent with creation of the first snapshot copy and the second snapshot copy.

8. The non-transitory computer readable medium of claim 7, wherein the method further comprises:
transmitting a first copy of the first snapshot copy to a second device for storage on the second device.

9. The non-transitory computer readable medium of claim 7, wherein the first snapshot copy and the second snapshot copy are obtained for restoration from a single device.

10. The non-transitory computer readable medium of claim 7, wherein prior to initiating restore of the first snapshot copy and the second snapshot copy, the method further comprises:
receiving an indication to quiesce a second network device concurrently with quiescing the first network device;
pausing new communication processing on the second network device for a second period of time sufficient to complete processing of at least a portion of any in-progress communications on the second network device;
creating a second snapshot copy of a second state of the second network device, the second state including information from the second network device describing software application run-time execution parameters, software application configuration parameters, hardware run-time execution parameters, and hardware configuration parameters;
resuming communication processing on the second network device; and
storing the second snapshot copy of the second state of the second network device.

11. The non-transitory computer readable medium of claim 10, wherein at least one of the first memory comprises local memory storage of the first network device, and wherein the second memory comprises local memory storage of the second network device.

12. The non-transitory computer readable medium of claim 7, wherein the method further comprises:
restoring the first snapshot copy to a third network device;
restoring a second snapshot copy, corresponding to a second device, to a fourth network device; and
diagnosing a network anomaly using information from the third network device and the fourth network device.

13. The non-transitory computer readable medium of claim 7, wherein the method further comprises:
restoring the first snapshot copy to the first network device; and
diagnosing a network anomaly using information from the first network device after completing a restore of the first snapshot copy.

14. A computer network device, comprising:
a first processing unit;
a first network communications interface communicatively coupling the first processing device to a computer network; and
a memory communicatively coupled to the first processing unit, wherein the memory stores instructions, that when executed by the first processing unit, causes the first processing units to perform a network device snapshot function, the network device snapshot function configured to:
receive an indication to quiesce a first network device;
pause new communication processing on the first network device for a first period of time sufficient to complete processing of at least a portion of any in-progress communications on the first network device;
create a first snapshot copy of a first state of the first network device, the first state including information from the first network device describing software application run-time execution parameters, software application configuration parameters, hardware run-time execution parameters, and hardware configuration parameters;
resume communication processing on the first network device;
store the first snapshot copy of the first state of the first network device; and
restore the first snapshot copy to a third network device;
restore the second snapshot copy to a fourth network device; and
diagnose a network anomaly using information from the third network device and the fourth network device.

15. The computer network device of claim 14, wherein the network device snapshot function is further configured to transmit a copy of the first snapshot copy to a second device for storage on the second device.

16. The computer network device of claim 14, wherein the network device snapshot function is further configured to:
restore the first snapshot copy to the first network device; and
diagnose a network anomaly using information from the first network device after completing a restore of the first snapshot copy.

17. The computer network device of claim 14, wherein the network device snapshot function is further configured to:
initiate restore of the first snapshot copy to a second network device;
initiate restore of a second snapshot copy made on a second network device concurrently with the first snapshot copy to a third network device; and
analyze information from both the first snapshot copy and the second snapshot copy to identify a network anomaly present at a period of time consistent with creation of the first snapshot copy and the second snapshot copy.

* * * * *